United States Patent [19]

Patejak

[11] 4,024,780
[45] May 24, 1977

[54] FLYING ROTARY SAW
[75] Inventor: Jerzy F. Patejak, Wampum, Pa.
[73] Assignee: Aetna-Standard Engineering Company, Ellwood City, Pa.
[22] Filed: June 17, 1975
[21] Appl. No.: 587,605
[52] U.S. Cl. .................................. 83/306; 83/311; 83/327; 83/329
[51] Int. Cl.[2] ........................................ B23D 45/22
[58] Field of Search ............ 83/306, 307, 299, 311, 83/327, 328, 329, 330

[56] References Cited
UNITED STATES PATENTS

| | | | |
|---|---|---|---|
| 2,645,001 | 7/1953 | Rodder | 83/327 X |
| 2,693,630 | 11/1954 | Rodder | 83/306 X |
| 2,836,880 | 6/1958 | Chang | 83/311 |
| 3,267,785 | 8/1966 | Pferdekamper | 83/327 X |
| 3,333,495 | 8/1967 | Stuchbery et al. | 83/328 X |

Primary Examiner—J. M. Meister
Attorney, Agent, or Firm—Mandeville and Schweitzer

[57] ABSTRACT

An improved flying saw of simplified and more economical construction is disclosed which operates smoothly with reduced vibration and which performs in an improved manner at higher operating speeds. The machine has a main crank arm with a rotary saw blade at one end and an adjustable counterweight at the opposite end, a stabilizing crank arm with a counterweight, and a connecting rod causing the arms to rotate in unison. Both arms telescope to permit simultaneous adjustments of arm radius while screw jacks adjust the height of the crank axis relative to the work. The work is supported on a wheel having a special sliding-block eccentric which moves the wheel in a vertical direction to deflect the work into the path of the rotary saw blade. A quickdrop support bracket permits lowering of the wheel and its eccentric away from the path of the work in an emergency situation so that flow from the mill need not be interrupted.

7 Claims, 14 Drawing Figures

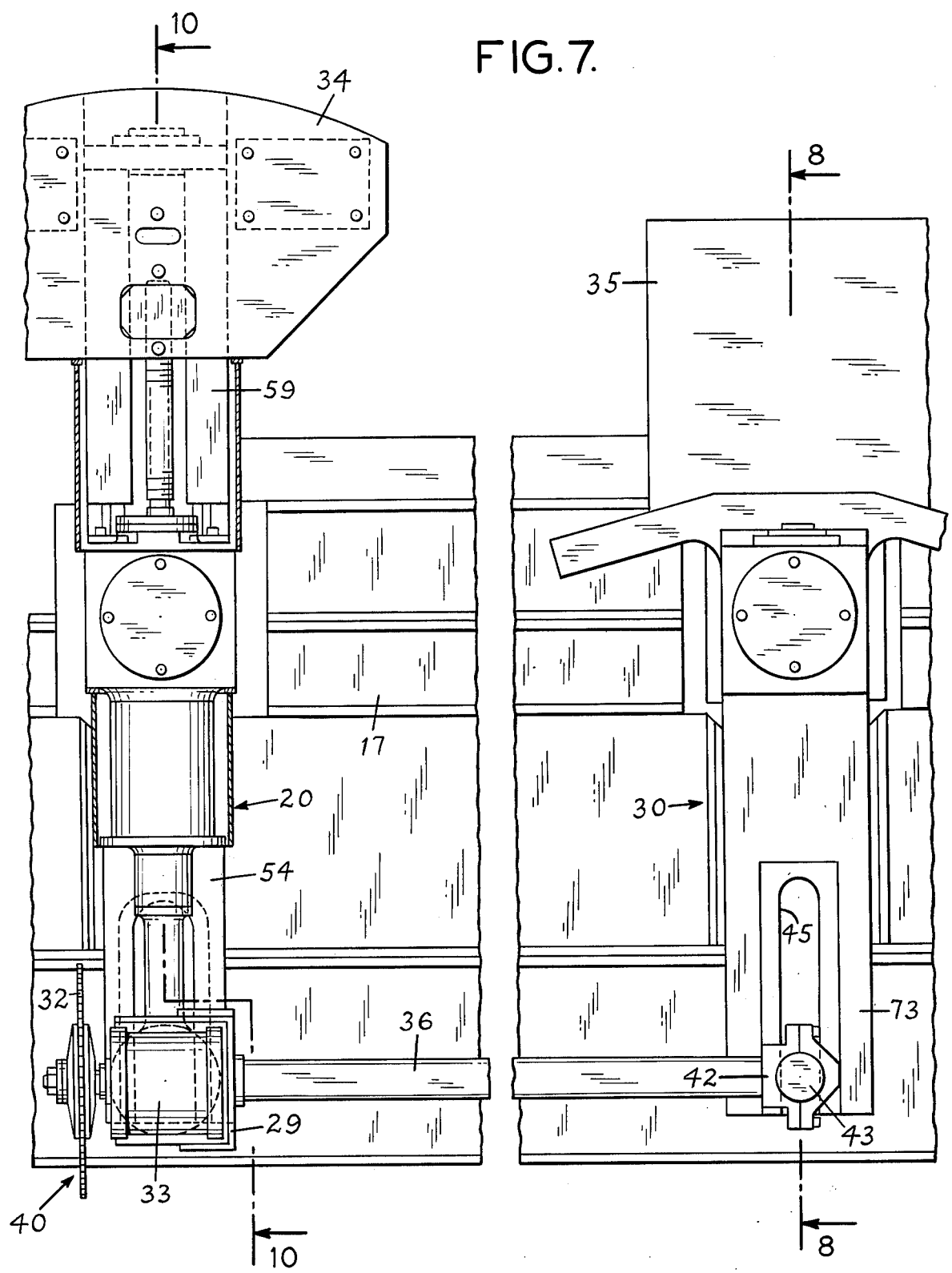

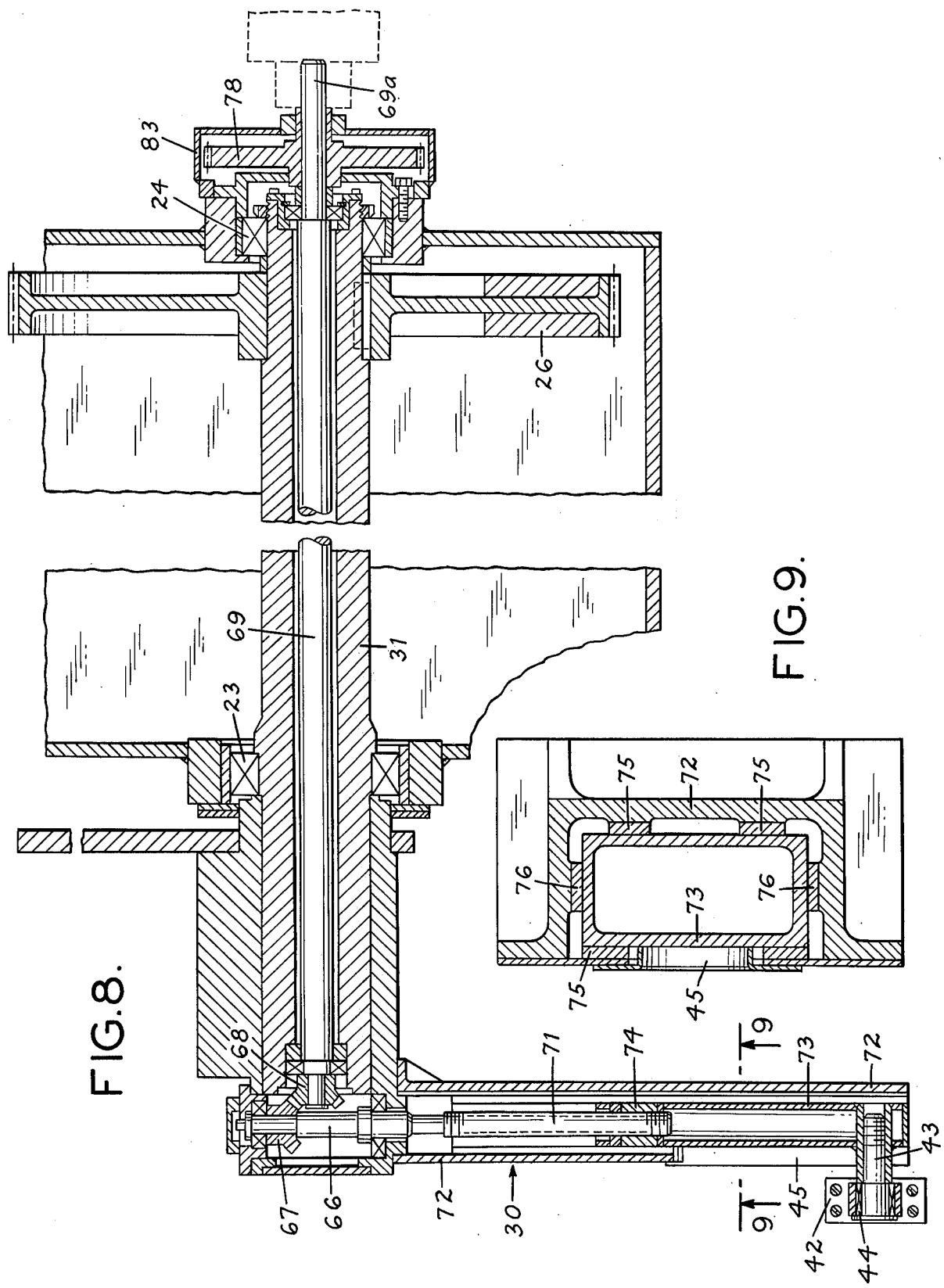

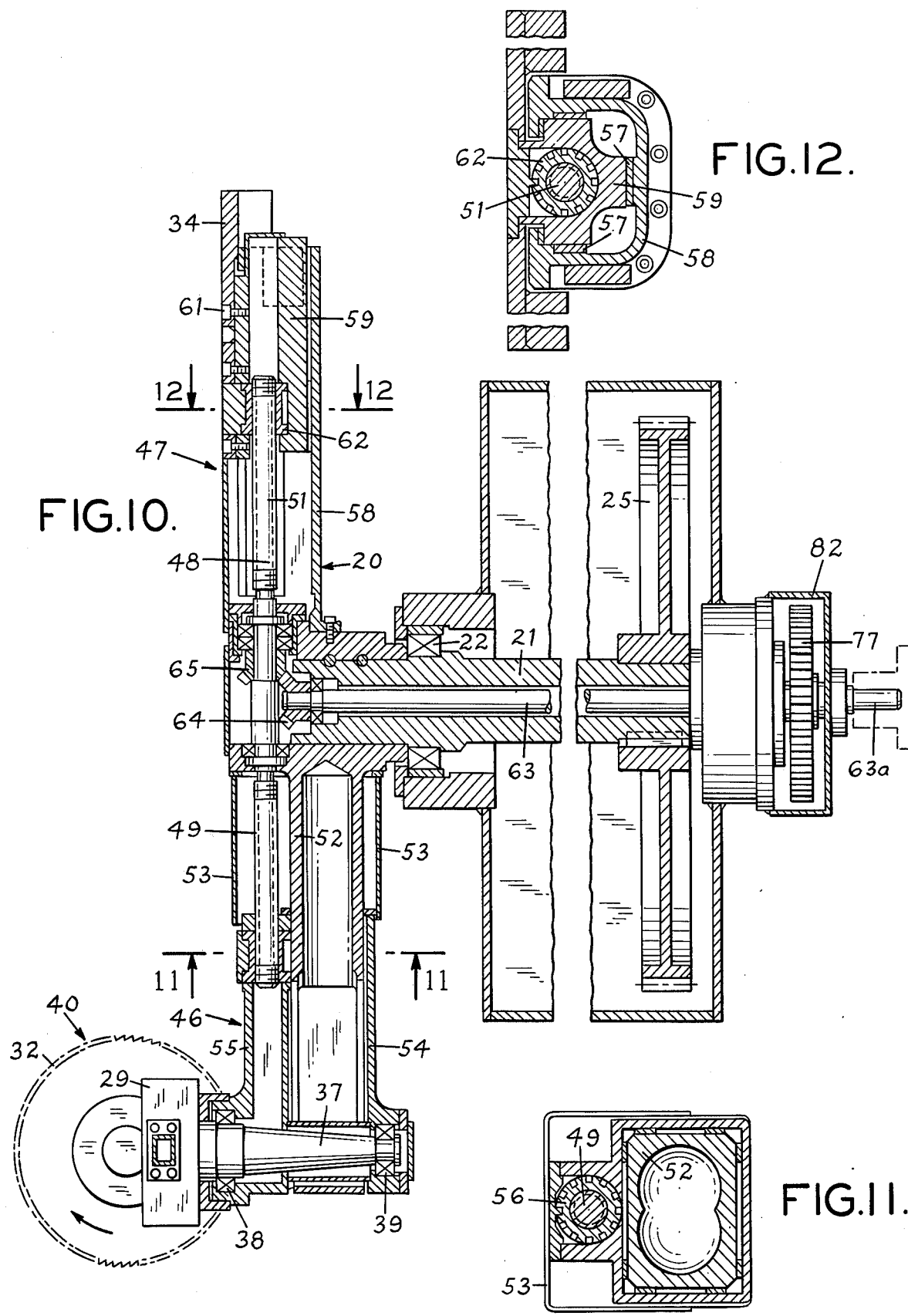

FLYING ROTARY SAW

BACKGROUND OF THE INVENTION

This invention relates to apparatus for cutting off successive lengths from continuously moving stock and more particularly to flying saws for severing rapidly moving tubing, pipe, rod or the like into acurately cut lengths as the material emerges from a mill. The apparatus described herein is designed particularly for sawing welded pipe into lengths, but it is understood that the invention has other uses and applications.

In the manufacture of steel pipe by a well-known process, skelp is heated to welding temperature in a furnace and then passed at high speed through forming and welding rolls in which the skelp is formed into tubular shape and the abutting edges welded together to form the pipe. The skelp is supplied in large coils and the forward end of one coil is welded to the trailing end of the preceding coil before the skelp enters the furnace, thus making it possible to carry on the welding operation for relatively long periods of time without interruption. Mills of this type operate at high rates of speed, such as 1,000 feet per minute or greater. In order to cut the pipe into lengths as it emerges from the mill, a high-speed flying cut-off mechanism is provided.

Flying saws or cut-offs for use in mills of this type are disclosed in U.S. Pat. No. 2,645,001 and in U.S. Pat. No. 2,775,808. In this type of apparatus a circular saw or other cutting tool is carried in a circular path or orbit by a rotary support, such as a crank mechanism. Means are provided for guiding the work in a horizontal path disposed in a plane parallel to the plane of the circular orbit of the cutting tool, the direction of action of the cutting tool being perpendicular to the path of the work. The work is guided in a path which is normally adjacent to, but which does not intersect, the circular path of the cutting tool; and means are provided for periodically deflecting the work upwardly from its normal path into the path of the cutting tool, thereby causing the stock to be severed. When cutting pipe of relatively large diameter, as disclosed in said Pat. No. 2,775,808, the superstructure upon which the rotary support for the saw assembly is mounted may be deflected downwardly at the same time that the work is deflected upwardly.

Apparatus of the type described above has been successfully used for many years and operates well at work speeds in excess of 1,000 feet per minute. Such apparatus is capable of uninterrupted operation for relatively long periods of time, can be adjusted to handle pipe of various sizes, can be operated at different mill speeds, and can provide high quality cuts at the ends of the pipe. Also the length of cut and the lineal speed of the cutting tool in its orbit can be varied while the apparatus is running. However, the efficiency of such apparatus has been limited at very high operational speeds for a number of reasons. The smoothness of operation and the quality of the cutting was reduced when the speeds were increased to 1500 feet per minute or higher. Another disadvantage of the apparatus was that malfunctions such as failure of the cut-off device necessitated shutting down the mill for a period of time.

SUMMARY OF THE INVENTION

The present invention relates to a much improved flying hot saw designed to function smoothly and provide high quality cutting at speeds up to 2000 feet per minute. The equipment is simplified, less expensive to make, and easier to maintain than the older equipment and is lighter in weight. A better balance of forces is provided so as to reduce vibrations and permit smooth operation at high speeds.

The apparatus of the invention has a main crank arm with a rotary saw or other cutting tool at one end and a counterweight at the other end and has a stabilizing crank arm parallel to the main crank arm and pivotally connected thereto by a connecting rod. The arms are of a telescoping construction, and the radius of both arms can be adjusted simultaneously by screw means while the machine is in operation. At the same time the crank arm radius is adjusted, screw jacks adjust the distance from the normal path of the work to the axis of the main crank arm so that the lowermost point of the saw blade in its orbit remains substantially the same. The adjusting means make it possible to obtain the correct crank radius for the best quality cut. The stabilizing arm and its counterweight in combination with the main crank arm provide a simple, light weight construction with an improved balance of forces so that the machine functions well at very high speeds.

In accordance with the invention, improved means are provided for deflecting the work into the path of the cutting tool including a generally cylindrical wheel. A special slidingblock eccentric is provided for causing the wheel to move up and down in a substantially vertical direction. The eccentric means are journaled for rotation in an elongated support bracket which is pivotally mounted and can be dropped quickly during an emergency to discontinue cutting without interrupting the movement of the work out of the mill. Toggle means are preferably provided to hold said bracket in its normal position, and reciprocating fluid motor means are provided to operate the toggle means.

BRIEF DESCRIPTION OF THE DRAWINGS

In the drawings:

FIG. 7 is a foreshortened fragmentary front elevational view showing a portion of FIG. 1 on a larger scale;

FIG. 8 is a vertical section taken on the line 8—8 of FIG. 7;

FIG. 9 is a section taken on the line 9—9 of FIG. 8 and on a larger scale;

FIG. 10 is a section taken on the line 10—10 of FIG. 7;

FIG. 11 is a section taken on the line 11—11 of FIG. 10 and on a larger scale;

FIG. 12 is a section taken on the line 12—12 of FIG. 10 and on a larger scale;

DESCRIPTION OF THE PREFERRED EMBODIMENTS

Figure 1:
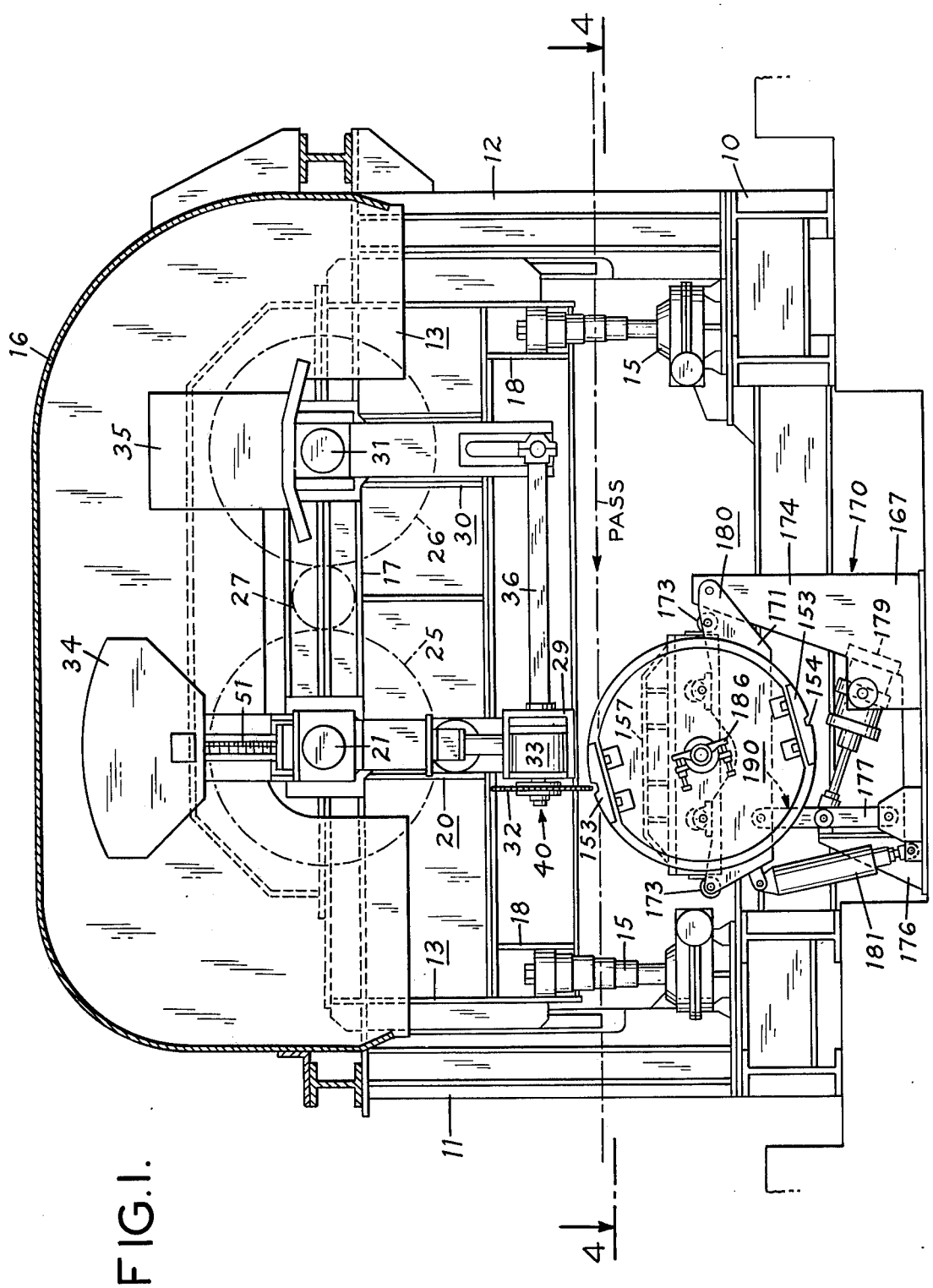
FIG. 1 is a front elevation of a flying hot saw embodying the present invention.

A preferred form of flying saw embodying the present invention is shown in FIGS. 1 to 14 of the drawings, in which like parts are identified by the same numerals throughout the several views. FIGS. 1, 2, 3 and 7 to 14 are drawn substantially to scale to facilitate an understanding of the invention, but it will be understood that the size and shape of the equipment may vary considerably.

The flying saw shown in the drawings has a main base section 10 with a vertical guide posts 11 and 12 and a top platform drive housing section 13 mounted to move vertically between said posts. Said housing section is adjustably supported by four screw jacks 15 at the corners of the section which are mounted on the base section 10 and which can be operated simultaneously to raise or lower the housing ot the desired height without tilting the same. The housing section includes a curved sheet metal cover 16 and a rigid frame 17 with lateral support members 18 attached to the upper ends of the screw jacks 15.

A main crank arm 20 and a stabilizing crank arm 30 are provided in the housing section 13. The arms are mounted on the ends of two parallel horizontal hollow shafts 21 and 31, respectively, which are journaled for rotation in the frame 17 on suitable bearings including bearing 22, 23 and 24 (FIGS. 8 and 10). Gears 25 and 26 are mounted on the ends of the shafts 21 and 31 and are driven by a central drive pinion 27 having a drive shaft 28.

The main crank arm 20 has a rotary saw unit 40 mounted at the end of the arm. The saw unit includes a housing 29, a circular saw blade 32, and an electric motor 33 carried by the housing for driving the blade. A counterweight 34 is mounted on the opposite end of the arm 20 to counterbalance the weight of the unit 40.

A counterweight 35 is mounted in a fixed position at one end of the stabilizing arm 30, and a horizontal connecting rod 36 is pivotally connected to the opposite end of the arm 30 and to the end of the main crank arm 20 adjacent the rotary saw unit 40, whereby the arms 20 and 30 are caused to rotate in unison.

The pivotal connection between the connecting rod 36 and the crank arm 20 includes a short shaft 37 carried by the housing 29 and mounted for rotation in bearings 38 and 39 carried by arm portion 54 as shown in FIG. 10. The rod 36 is rigidly connected to the housing 29 and holds it against rotation. The saw unit 40 is rigidly mounted on the housing 29 so that the axis of rotation of the saw blade 32 remains in a horizontal position during rotation of the arm 20.

The connection between the rod 36 and the stabilizing arm 30 can be similar to the pivotal connection at 37. As shown in FIG. 8 the end portion 42 of the rod 36 is rotatably mounted by a bearing 44 on a pivot shaft 43 which extends through a slot 45 and is rigidly connected to the portion 73 of the arm 30.

The main crank arm 20 (FIG. 10) comprises hollow telescoping assemblies 46 and 47 at opposite sides of the shaft 21 and a crank arm adjusting shaft 48 with threaded portions 49 and 51 of opposite hand. The assembly 46 has a fixed portion 52 with a fixed outer sleeve 53 and has a movable portion 54 which slides radially inside the fixed portion 52. The movable portion has a cavity 55 to receive the screw 48 and a non-rotatable member 56 with internal threads which fit the threads of the screw portion 49, whereby the portion 54 moves radially in response to turning of the screw 48 in either direction.

The assembly 47 shown in FIG. 10 has a fixed portion 58 and a movable portion 59 which slides radially inside the portion 58 on guide plates 57. The counterweight 34 is rigidly connected to the portion 59 by screws 61 and is adjusted radially in response to turning of the screw 48. A non-rotatable member 62 carried by the portion 59 has internal threads which fit the threads of the screw portion 51, whereby the portion 59 moves radially inwardly or outwardly in unison with the portion 54 of assembly 46.

Figure 6:
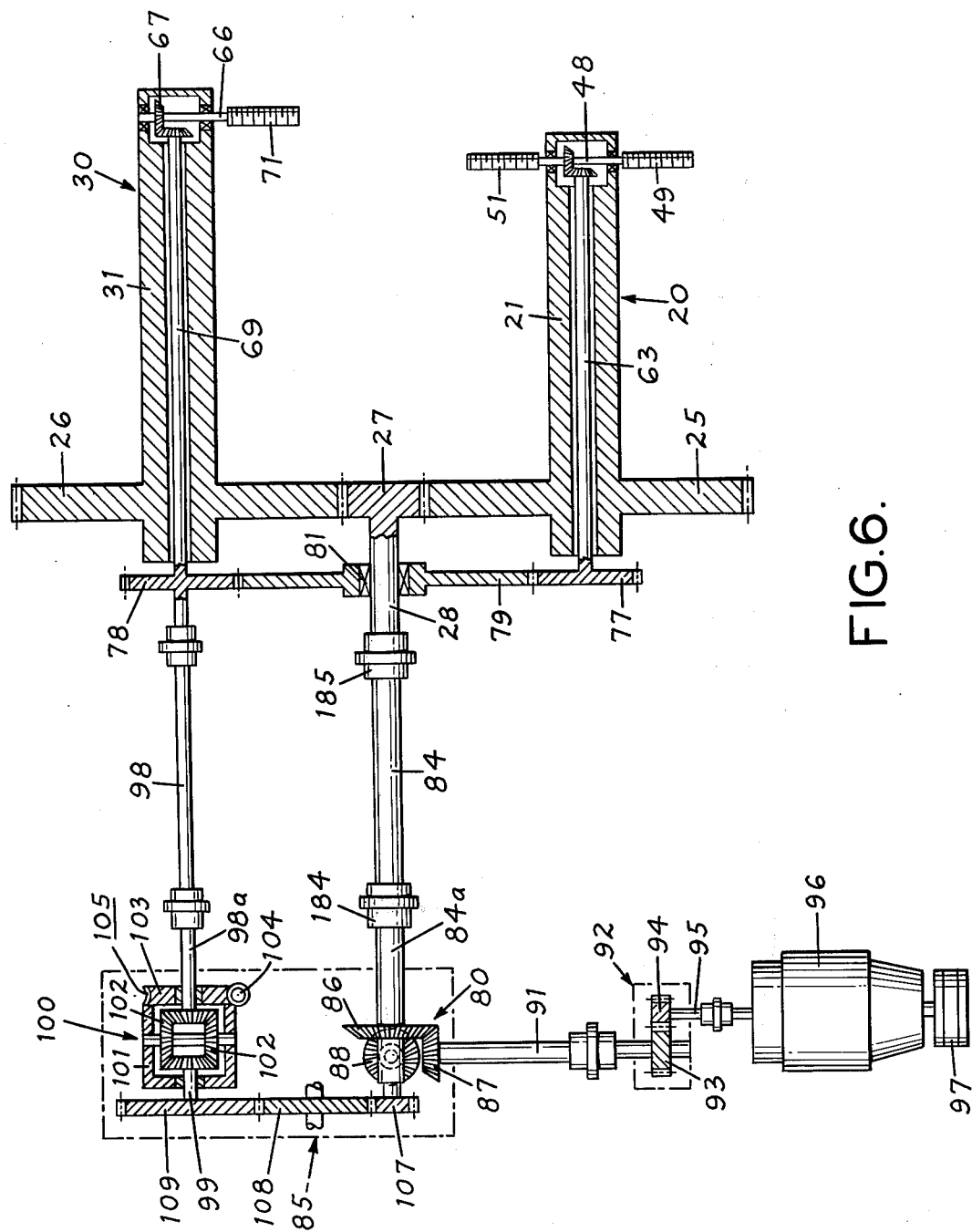
FIG. 6 is a schematic view with parts omitted showing the means for adjusting the radius of the main crank arm and the stabilizing arm.

The shaft 21 of the main crank arm is hollow and contains a shaft 63 having a gear 64 at its outer end. The latter gear 64 drives a gear 65 on the adjusting shaft 48 to effect rotation of that shaft. A similar drive is provided for the stabilizing arm 30 as indicated in FIGS. 6 and 8. The latter arm has an adjusting shaft 66 with a gear 67 at the end thereof meshing with a gear 68 of a central shaft 69 located within the hollow shaft 31. The adjusting shaft 66 has a threaded portion 71 which screws into an internally threaded member 74. The stabilizing arm has a fixed portion 72 with a slot 45 and has a radially movable portion 73 which slides on guide plates 75 and 76. The threaded member 74 effects a driving connection between the adjusting shaft 66 and the movable portion 73 to cause the latter to move radially in or out in response to rotation of the shaft in either direction. Thus, the adjustment of the length of the stabilizing arm 30 is effected by relative rotation between the shaft 69 and the hollow shaft 31 as is the case with the main crank arm 20. However, the counterweight 35 of the stabilizing arm is not adjusted in the apparatus shown herein.

A gear 77 (FIG. 6) is mounted on the end portion 63a of the shaft 63 within a housing 82 (FIG. 10) and meshes with a central gear 79 surrounding the shaft 28. A gear 78 is mounted on the end portion 69a of the shaft 69 within a housing 83 (FIG. 8) and also meshes with the gear 79 as shown in FIG. 6. The gears 77 and 78 are of the same size and have the same number of teeth so that the shafts 63 and 69 are adjusted in equal amounts. The gear 79 is mounted on a bearing 81 for free rotation relative to the shaft 28. When the apparatus is operated in such a manner that there is no relative rotation between the shaft 69 and the shaft 31, there will be no relative rotation between the shaft 63 and the shaft 21 of the main crank arm.

Figure 5:
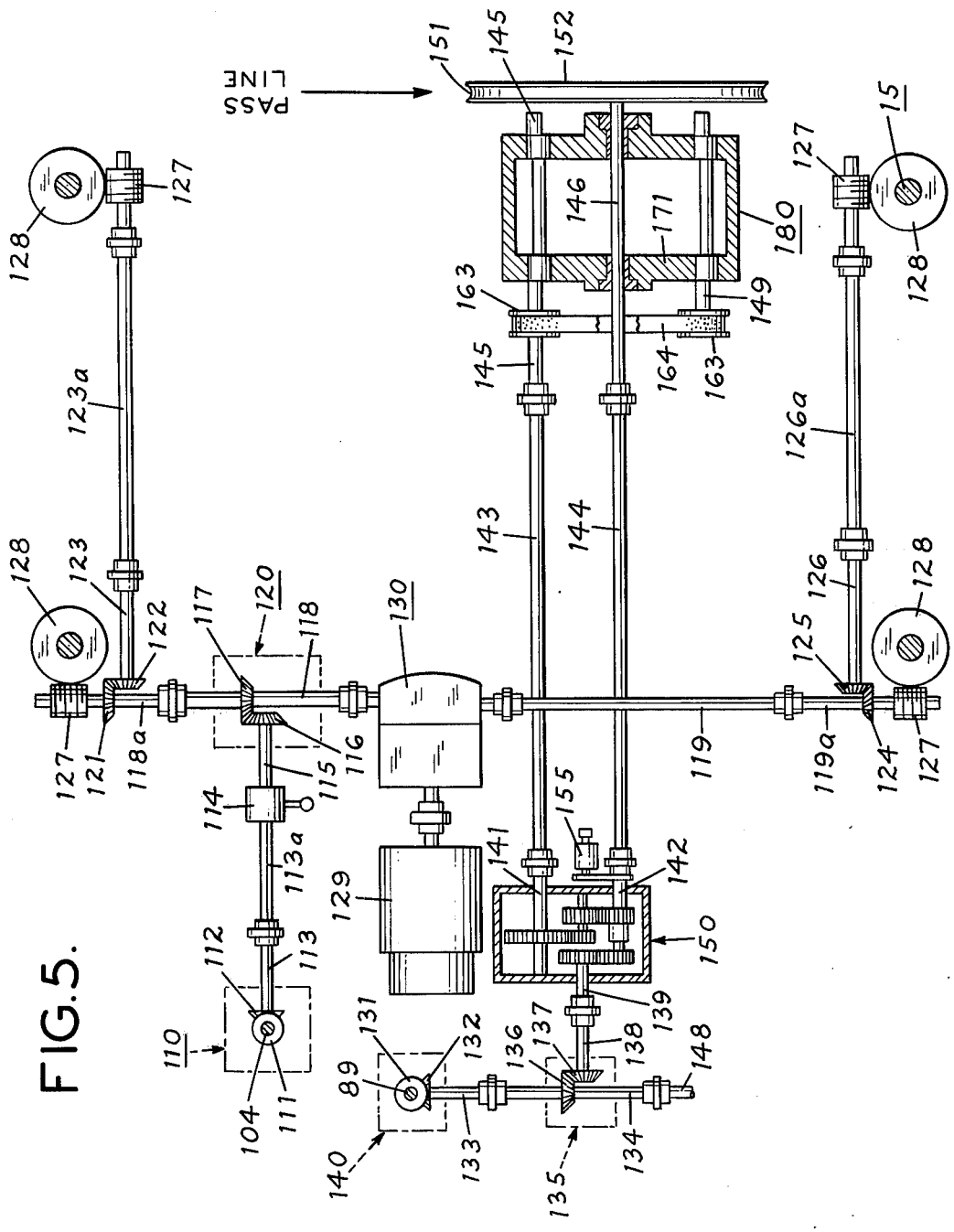
FIG. 5 is a schematic view with parts omitted showing portions of the drawings and adjusting means of the flying saw.

As shown in FIG. 6, the drive pinion 27 for the crank arms 20 and 30 is driven by a shaft 84 having universal joints 184 and 185 (FIG. 2) and having a portion 84a which carries a bevel gear 86. The latter is part of a main drive gear train 80 which is located within a main drive gear housing 85. Said housing contains the unit 80 and also a differential 100 which is operably connected to the gear train 80 by gears 107, 108 and 109. The gear train 80 comprises the gear 86, a gear 87 mounted on a drive shaft 91 and meshing with the gear 86, and a gear 88 mounted on the end of the vertical shaft 89 of a drive unit 140 (FIG. 5). The small gear 197 is rigidly mounted on the end of the shaft 84a and meshes with the intermediate gear 108 as shown in FIG. 6.

The drive shaft 91 is connected to the gear 93 of reduction gearing 92 having a gear 94 meshing with gear 93 and rigidly mounted on the end of a shaft 95 which is driven by a main drive motor 96. A holding brake 97 is connected to the shaft of the motor to permit braking of the motor.

Figure 2:
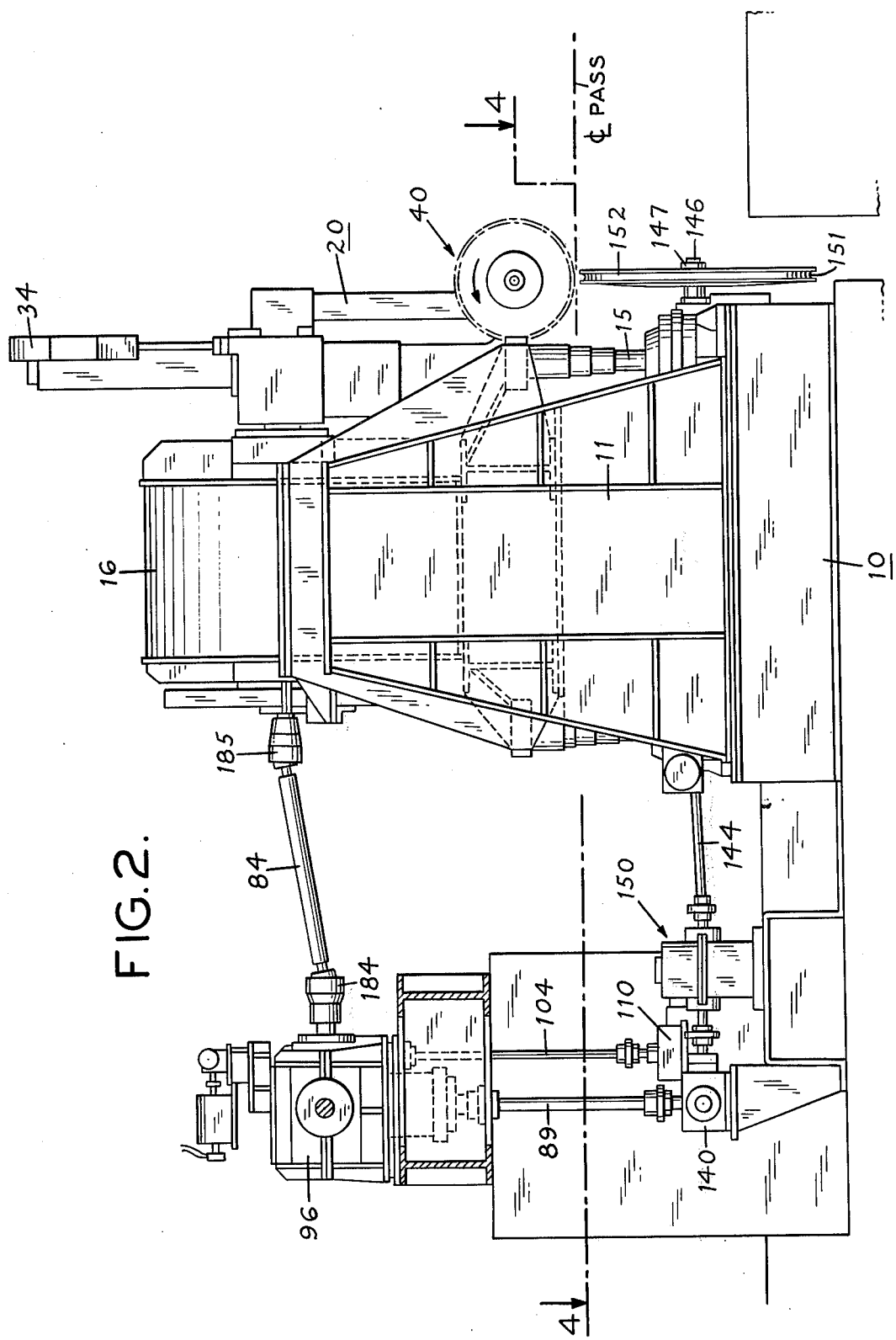
FIG. 2 is a side elevation of the machine shown in FIG. 1.
Figure 3:
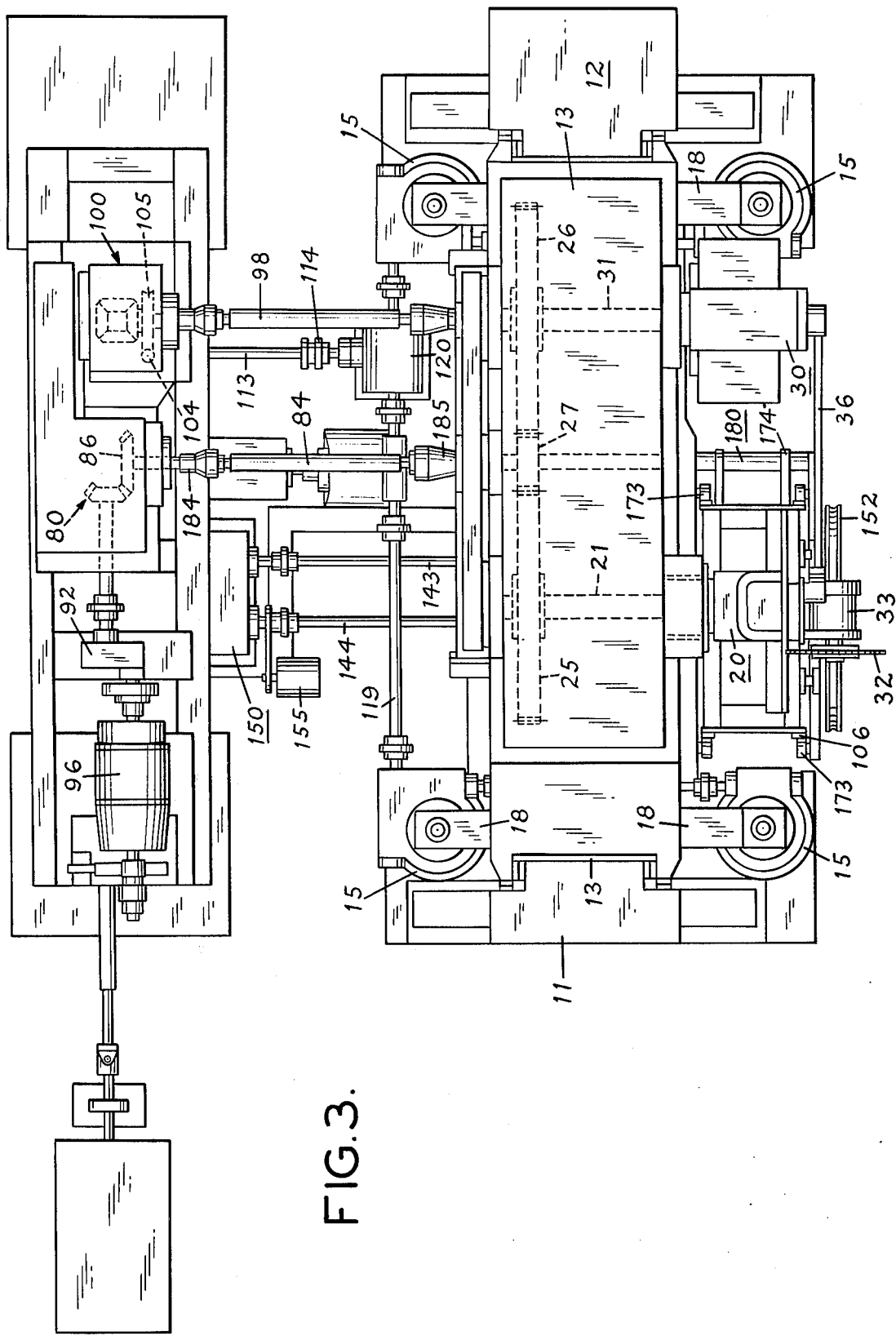
FIG. 3 is a top plan view of the machine.

The gear 78 of the crank arm 30 (FIG. 6) is rigidly connected to a shaft 98 which is parallel to shaft 84 and which has a portion 98a operably connected to the output of the differential 100. A short shaft 99 at the opposite side of the differential is coaxial with shaft 98 and is rigidly connected to the gear 109. The differential is of conventional construction including a rotatable housing 101 and a pair of freely rotatable gears 102 mounted in axial alignment for rotation relative to the housing. A worm gear 103 is rigidly connected to the housing 101 coaxial with the shaft 98a and has teeth which mesh with the threads of a vertical worm shaft 104 (FIGS. 2 and 6). The elements 103 and 104 form a worm drive 105 which serves to permit adjustment of the radius of the arms 20 and 30 during operation of the machine. The differential may be constructed substantially as disclosed in U.S. Pat. No. 2,645,001 (see FIG. 7).

In a typical machine of the type illustrated herein the pinion 27 (FIG. 6) has one-fourth the number of teeth as the gear 25 or 26, and the gears 64, 65, 67 and 68 have the same number of teeth so that a 4:1 ratio is provided. A 4:1 ratio is also provided by the gears 107, 108 and 109 so that, when the worm 104 is stationary, the adjusting shafts 48 and 66 do not rotate relative to the shafts 21 and 31. For example, gears 107, 108 and 109 can be provided with 30, 100 and 120 teeth, respectively, to provide the desired ratio. With this arrangement it is not necessary to stop the operation of the machine in order to adjust the radius of the arms 20 and 30. All that is necessary is to rotate the worm 104 and the housing 101 of the differential reducer so as to cause the desired adjustment.

The adjustment of the worm 104 is effected by a crank arm adjusting drive 110 (FIG. 5) which includes a gear 112 meshing with the gear 111 of worm 104 and rigidly connected to a horizontal shaft 113 having a portion 113a connected to a manual clutch 114. The clutch is provided between the shaft 113 and a coaxial shaft 115 which has a gear 116 at the end thereof. The clutch makes it possible to connect the shafts 113 and 115 together or to disconnect them so that shaft 113 can remain stationary while the shaft 115 rotates.

The gear 116 is part of a jack adjusting drive 120 having a gear 117 meshing with gear 116 and rigidly connected to a shaft 118. The latter shaft is driven by a jack drive motor 129 through a reduction gearing 130. The latter has gears for driving the shaft 118 and for driving a similar shaft 119 at the opposite sie of the reducer. As shown in FIG. 5 the end portion 118a of the shaft 118 is rigidly connected to a gear 121 which drives a gear 122 of the same size to effect driving of a horizontal shaft 123. In a similar manner the end portion 119a of the shaft 119 has a gear 124 which drives a gear 125 carried by the shaft 126. In this manner the four shafts 118, 119, 123 and 126 are driven at the same speed to effect uniform adjustment of all four jacks 15. As shown in FIG. 5 four worms 127, are provided at the ends of shafts 118a, 119a, 123a and 126a to drive the worm gears 128 of the four jacks 15 (FIG. 5).

Figure 4:
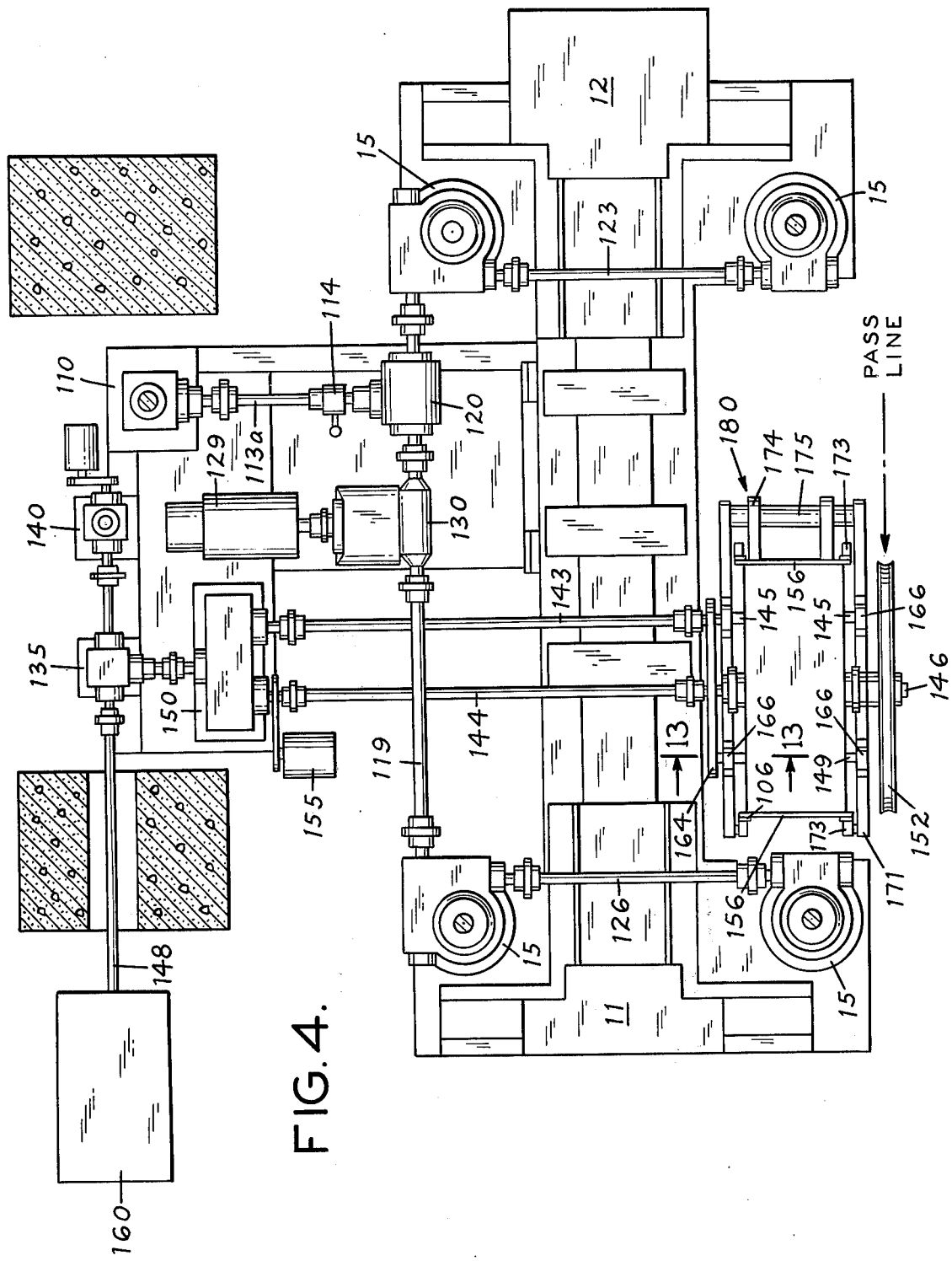
FIG. 4 is a horizontal section taken on the line 4—4 of FIGS. 1 and 2.

The main drive gear housing 85, located behind the rotary saw top platform, contains the crank arm main drive train 80 (FIG. 3) the screw differential 100, and the worm drive 105 which drives the adjusting screw shaft through the drive 110. The units 110 and 140 (FIG. 4) are located below the drive train 80 and the differential 100. As indicated in FIG. 5, a gear 131 is rigidly mounted on the lower end of the vertical shaft 89 and meshes with a gear with 132 carried by the shaft 133. The gears 131 and 132 of the drive unit 140 provide a driving connection between the main drive and gearing 135 having a shaft 134 connected to shaft 133. A gear 136 carried by the shaft 134 meshes with and drives a gear 137 of the gearing 135, which is rigidly connected to a horizontal shaft 138. The end of the shaft 134 is rigidly connected to a shaft 148 which extends to a speed-compensating electrical control unit 160 (FIG. 4).

The shaft 138 is connected to the input shaft 139 of a two-speed gear-box eccentric drive 50 (FIG. 5) having a pair of output shafts 141 and 142. The shaft 141 is rigidly connected to a long flexible shaft 143 which drives the shaft 145 of the cam wheel and eccentric unit 180 described hereinafter. The shaft 142 is rigidly connected to a long flexible shaft 144 which drives the shaft 146 of said unit. A cam shaft drag brake 155 acts on the shaft 142 to keep tension on the cam wheel shaft and to eliminate any backlash that exists in the gearing and couplings.

FIGS. 1, 4, 5 and 14 show an eccentric unit 180 having a generally circular cam wheel 152 which is periodically deflected to lift the hot pipe into the saw blade. The cam wheel 152 is mounted on a shaft 146 which is mounted for rotation in the housing or frame 157 by suitable bearings. An adjustable connecting means 186 (FIG. 1) locates the angular position of the cam wheel on the shaft. The shaft 146 is driven by shaft 144 in timed relation with the main crank arm 20. The entire unit 180 is mounted independent of the saw proper and is driven by the long flexible shafts 143 and 144 which accommodate the vertical movement of the cam wheel.

The cam wheel 152 is generally cylindrical in shape with a groove 151 around the perimeter to receive the hot pipe. The cam wheel has a pair of removable inserts 153 (FIG. 1) with notches 154 to receive the cutting blade 32. Two inserts 153 are needed because cutting is performed every 3 or 3 ½ revolutions of the cam wheel for every 2 revolutions of the main crank arm 20.

Figure 13:
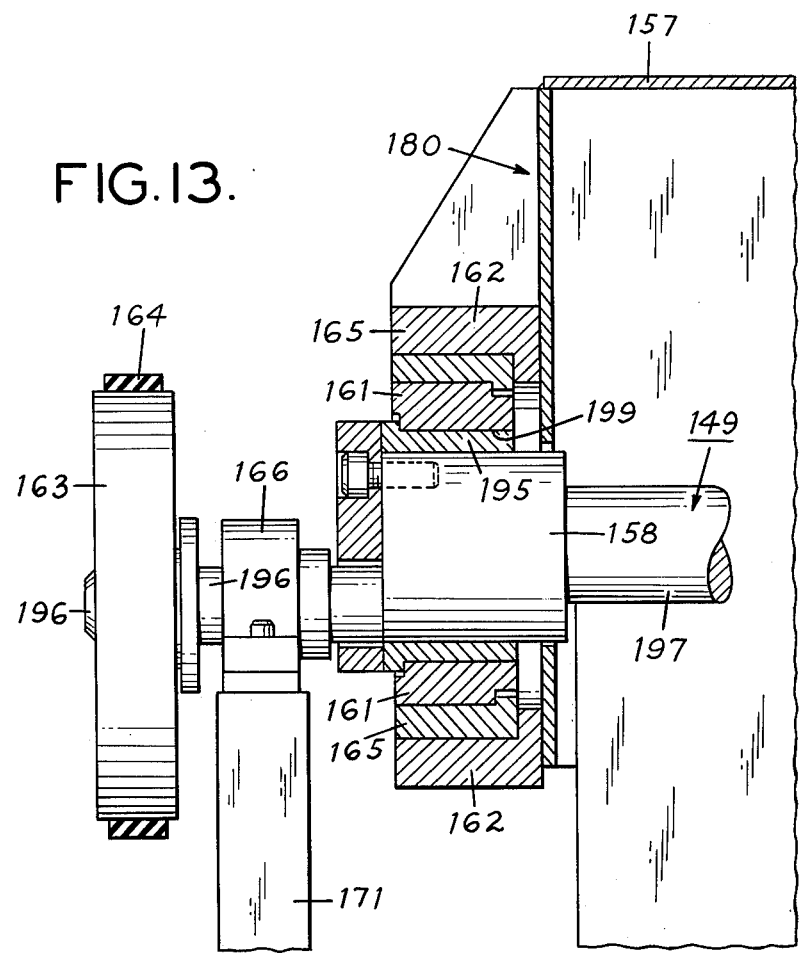
FIG. 13 is a fragmentary sectional view taken on the line 13—13 of FIG. 4 showing the eccentric shaft and associated parts.
Figure 14:
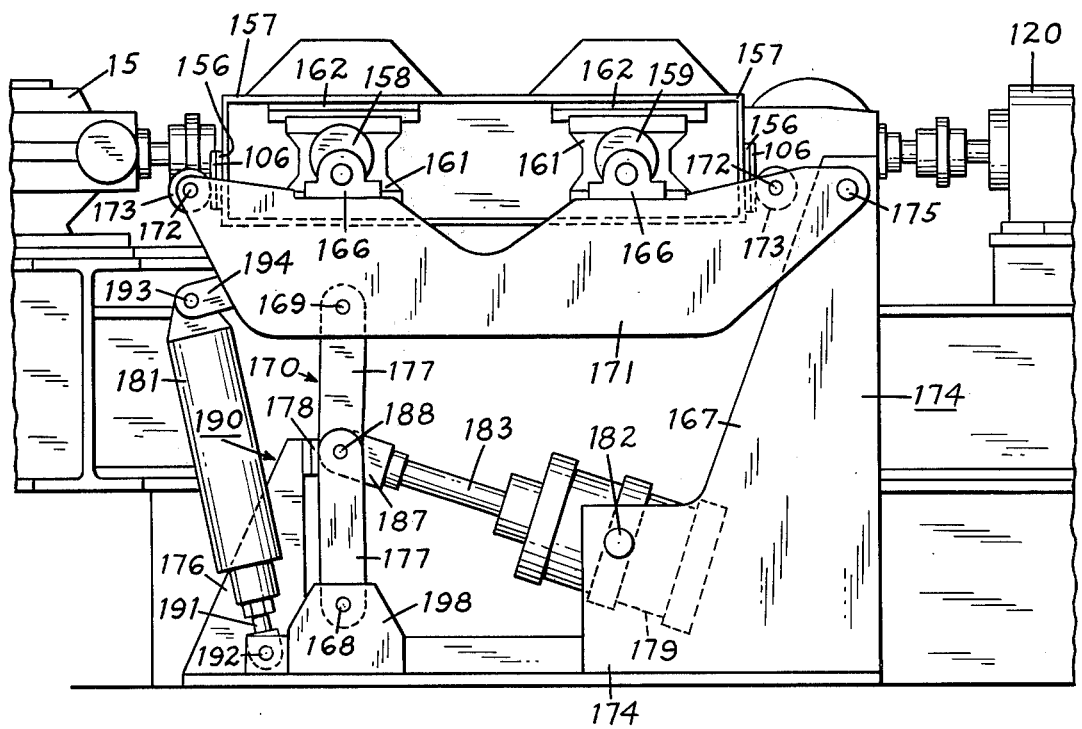
FIG. 14 is a fragmentary front elevation of the apparatus of FIG. 1 on a larger scale.

The eccentric unit 180 (FIG. 5) has two eccentric shafts 145 and 149 with eccentrics 158 and 159 to effect vertical movement of the frame 157. Timing belt sheaves 163 are mounted on the shafts 145 and 149 and are driven by a timing belt 164 so that said shafts rotate at the same speed. FIGS. 13 and 14 indicate the mounting of the eccentric shaft 149 and illustrate how the vertical movement is effected. Brackets 171 are provided at opposite sides of the frame 157 with bearing means to support the two shafts 145 and 149. Pillow blocks 166 are mounted on the brackets 171 at opposite sides of the frame 157 as shown in FIG. 4 to provide bearing supports for the eccentric shafts near the opposite ends thereof. The brackets 171 are supported at one end on a rod 175 carried by the two upright plates 167 of a base 174. The other end of the brackets 171 is supported from the base by toggle means 190 which may be retracted to lower the brackets 171 and to lower the cam wheel 152 to a noncutting position.

The eccentric shafts 145 and 149 of the unit 180 are of basically the same construction and function in the same manner to effect vertical reciprocation of the frame 157 relative to the brackets 171 in response to rotation of the shafts. The construction of shaft 149 as illustrated in FIG. 13 is thus essentially the same as that of the shaft 145 except that the shaft 145 is elongated for connection to the drive shaft 143. As shown the bearing of the pillow block 166 supports the eccentric shaft 149 for rotation about a horizontal axis parallel to the axis of the cam wheel shaft 146. The sheave 163 is mounted on the end portion 196 of the shaft for rotation about that axis. The shaft has an eccentric portion 158 which is identical with the portion 159 of the shaft 145 and which has an external cylindrical surface with an axis offset from the aforesaid axis of the portion 196 a short distance, such as 1 to 2 inches. The shaft also has an externally cylindrical eccentric portion 197 of smaller diameter coaxial with the portion 158.

As indicated in FIGS. 13 and 14, an externally cylindrical sleeve 195 is mounted on the eccentric portion 158 within a sliding block 161 which has an internal cylindrical surface 199 fitting the external cylindrical surface of the sleeve 195 so that said sleeve is free to rotate within the block. The block has flat upper and lower horizontal surfaces which slide on flat horizontal guide plates 165. The latter are held in a fixed position by guide members 162 which are rigidly attached to the frame 157. The two sliding blocks 161 (FIG. 14) are arranged to reciprocate horizontally within the guide members 162 in response to rotation of the shafts 145 and 149. The sliding blocks thus make it possible for the eccentric portions 158 and 159 to raise and lower the frame 157 without moving it horizontally while the frame is maintained in a position parallel to the horizontal.

The eccentric unit 180 has means for guiding the frame 157 vertically and for preventing horizontal movement including two pairs of guide rollers 173 which are mounted on shafts 172 carried by the bracket 171. The rollers engage flat narrow vertical wear plates 106 located on the flat vertical end walls 156 of the frame 157. The rollers permit vertical movement of the frame 157 but prevent lateral movement or angular movement relative to the frame 174.

The unique construction of the unit 180 is advantageous for a number of reasons. It minimizes the weight and inertia of the parts and facilitates operation at high frequencies. The arrangement is such as to facilitate maintenance and replacement of worn parts. Also, the unique dropout feature provided by the toggle 190 minimizes the possibility of damage to the equipment while at the same time eliminating the problem of shutting down the entire mill because of a malfunction.

The toggle means is part of a special cam wheel dropout unit 170 (FIG. 14) which includes the brackets 171 and associated supporting means. As herein shown the brackets 171 provide a rigid supporting frame pivoted on the stationary rod 175. The opposite end of that frame is supported only by the toggle means 190 and may be lowered quickly by retracting the toggle. As shown, the lower lever 177 of the toggle is connected to a central pivot pin 188 and is supported at its lower end on a horizontal pivot pin 168 carried by a bracket 198 of the base 174. The upper lever 177 of the toggle is pivotally connected to a horizontal pivot pin 169 carried by the brackets 171, whereby the toggle supports said bracket.

The toggle means 190 is operated by a cylinder 179 pivotally mounted on a horizontal pivot pin 182 carried by the base 174. The piston rod 183 of said cylinder has a connecting member 187 at its outer end pivotally connected to the central pivot pin 188, whereby the toggle levers 177 are swung to and from the supporting position shown in FIG. 14 by reciprocation of the piston rod 183. As shown in FIG. 14 the toggle levers are slightly beyond the line of centers of the shafts 168 and 169 and are held by pressure in the cylinder 179 against a stop 178 located at the upper end of the upright portion 176 of the base 174. With this construction a very slight pressure on the piston of the cylinder 179 will maintain the toggle in its supporting position because the weight on the plate 169 tends to hold the toggle against the stop 178.

In the event of an emergency or an interruption in the flow of the hot pipe from the mill, the cylinder 179 may be operated immediately to retract the piston rod 183 and thereby lower the free end of the bracket frame 171. This will lower the cam wheel 152 at least several inches and far enough so that the continuing vertical reciprocation of the frame 157 of the unit 180 is insufficient to move the hot pipe into the path of movement of the cutting blade 32 of the saw. Thus the main crank arm 20 can continue to rotate with the saw unit 40 without effecting cutting of the pipe. This quick dropout feature is highly advantageous, and the low inertia of the parts makes it possible to effect dropping of the cam wheel in a very short period of time.

Because the movement is so rapid, it is desirable to cushion the downward movement and to provide cushioning means or the like to absorb the shock. This is preferably accomplished by employing a pair of shock absorbing spring units 181, which are compressed when the brackets 171 are lowered. As shown in FIG. 14 each unit 181 has a lower portion 191 pivotally mounted on a horizontal pin 192 carried by the base 174. The upper end of each spring unit is pivotally mounted on a horizontal pin 193 carried by a lug 194 which is rigidly connected to the bracket 171. The two spring units yieldably resist the fall of the brackets 171 and also assist in raising the brackets again. The cylinder 179 is preferably operated so as to put a positive retracting pressure on the piston rod 183, thereby causing the toggle lever to pull the brackets 171 downwardly to the inoperative retracted position. In other words, the brackets are forced down rapidly rather than being allowed to fall by gravity. The most rapid movement may be effected when employing a pneumatic cylinder 179, but it will be understood that hydraulic cylinders can also be employed. The spring units 181 may be of various constructions and may be somewhat similar to a conventional automobile shock absorber if desired.

The downward movement of the brackets 171 may also be cushioned by use of suitable valves controlling the flow of air to the cylinder 179. It is desirable to employ that type of cushioning in conjunction with springs, such as the units 181. Suitable limit switches and other electrical controls may be provided to control the upward and downward movement of the bracket 171 by the cylinder 179 and to control operation of the saw.

The main motor 96 of the saw is controlled by the speed compensating control unit 160 shown in FIG. 4, which is located above the main drive housing. It is geared to crank arm adjustment screw drive. The speed of the main drive motor is varied when the radius of the crank arm 20 is adjusted for cut length. This may be accomplished, for example, by potentiometers and associated electrical control means. The differential drive 100 can also provide independent adjustment of the crank arm radius to improve the quality of cut and to insure squaring of the pipe end. This may be accomplished by operation of screw drive 129 (FIG. 5) to rotate the worm 104. The amount of rotation of the crank arm adjustment screws can be measured to indicate the amount of adjustment of the crank arm length. The electrical controls of the unit 160 can change the speed of the motor 96 when the crank radius is adjusted to maintain the proper relationship between motor speed and the length of cut desired. The height of the saw relative to the pipe may also be carefully adjusted by operation of height adjustment motor 129. The clutch 114 permits this adjustment independently without rotating the worm 104 to adjust crank arm radius. It is thus relatively simple to make fine adjustments for cutting pipe of different diameters.

When the machine is in operation, it becomes necessary at times to make minor correction for length. This is done by adjusting the crank arm radius or the speed of rotation of the crank arm 20 together or independently. The accuracy to which a given length of pipe can be cut and the most desirable crank radius for a quality cut end is generally a matter of experience. The machine of the present invention permits all of the necessary adjustments needed to obtain optimum cutting.

In the machine shown herein the eccentric shafts 145 and 149 make one revolution for every two revolutions of the crank arm 20. The particular machine illustrated in the drawings is designed to cut pipe with diameters from three-eights inch through one inch and lengths from about 12 to 15 meters when operating at a maximum speed of about 2000 feet per minute. The peripheral speed of the saw carriage can be a few percent faster than the pipe speed. If it is desired to maintain a constant line speed, the cut length can be changed by increasing crank arm speed and decreasing crank arm radius for shorter pipe lengths and by decreasing crank arm speed and increasing crank radius for longer pipe length.

The cam wheel 152 located below the saw blade unit supports and lifts the pipe into the cut position every second revolution of the crank arms. The two cutting notches 154 located 180° apart in the cam wheel allows the saw blade to make a cut every 3 or 3½ revolutions of the cam wheel. In the specific machine shown herein the two eccentric shafts 145 and 149 have a 1½ inch throw and cause the cam wheel to be raised 3 inches into the cut position every second revolution of the crank arm 20. It will be understood, however, that various other arrangements may also be provided.

It will be understood that the above description is for purposes of illustration rather than limitation, and that, in accordance with the provisions of the patent laws, variations and modifications of the specific devices shown herein may be made without departing from the spirit of the invention.

I claim:

1. Apparatus for severing successive longitudinal sections from continuously moving elongated work such as pipe, tube, rod and the like comprising
   a. a rotary cutting saw,
   b. a rotary support directly mounting and supporting the load of said cutting saw comprising a main crank and means for rotating said crank about an axis to cause said saw to travel in a circular path,
   c. means for guiding the work in a normal path displaced radially from the axis of rotation of said main crank and near but not intersecting the path of said saw,
   d. means driven in synchronism with said crank for periodically deflecting the work from its said normal path into the path of the saw,
   e. a stabilizing crank mounted to rotate about an axis spaced from and parallel to the axis of said main crank,
   f. a connecting rod having one end pivotally connected to said stabilizing crank and its opposite end rigidly connected to said cutting saw to cause the cutting saw to maintain a predetermined orientation while said cranks rotate in unison,
   g. means for simultaneously adjusting the effective results of both cranks while the apparatus is operating,
   h. said main crank and said stabilizing crank having adjustable and fixed counterweights respectively, and
   i. the means for adjusting the main crank comprising means for correspondingly adjusting the counterweight therefore.

2. The apparatus of claim 1, in which
   a. said connecting rod is connected to said one end of said stabilizing crank and is generally parallel to the plane containing the axes of rotation of the two cranks.

3. In an apparatus for severing successive longitudinal sections from continuously moving elongated work having a cutting saw movable in a circular path, means for guiding the work in a normal path spaced a short distance from such circular path, and means for periodically deflecting the work from its normal path into the path of the saw to permit severing of said sections, the improvement which comprises
   a. a main crank arm having a central portion mounted to turn about a first axis,
   b. a stabilizing crank arm parallel to and spaced from said main crank arm and having a central portion mounted to turn about a second axis parallel to and spaced from said first axis,
   c. means mounting said cutting saw directly on the end of said main crank arm,
   d. a connecting rod pivotally connected at one end to one end of said stabilizing crank arm and rigidly connected at its opposite end to said cutting saw,
   e. a counterweight mounted on each of said crank arms at the end thereof remote from said connecting rod,
   f. the counterweight on said stabilizing arm being fixed thereon, and
   g. means for adjusting the counterweight on said main crank arm.

4. The apparatus of claim 3, in which said means for periodically deflecting the work into the path of the tool comprises
   a. a generally cylindrical wheel,
   b. means for rotating said wheel about an axis,
   c. means mounting said wheel for vertical movement, and
   d. means for periodically moving said wheel and said axis vertically.

5. The apparatus of claim 4 in which,
   a. said wheel is mounted for rotation on a support member, b. means are provided for guiding the support member vertically, and
c. eccentric means are provided for raising and lowering said support member periodically.

6. The apparatus of claim 5 in which,
a. said eccentric means are journaled for rotation in an elongated support bracket,
b. means are provided for pivotally supporting one end portion of said bracket, and
c. means are provided for swinging said support bracket from a retracted position wherein said wheel is below and out of the normal path of movement of the work to a normal operating position wherein the wheel periodically deflects the work into the path of movement of the cutting tool.

7. The apparatus of claim 6 in which,
a. toggle means are provided for supporting the other end portion of said bracket in said normal operating position, and
b. said means for swinging said support bracket comprises fluid motor means operably connected to said toggle means.

* * * * *